United States Patent [19]

Wiseman, Jr.

[11] 4,250,965
[45] Feb. 17, 1981

[54] WELL TREATING METHOD

[76] Inventor: Ben W. Wiseman, Jr., P.O. Box 5394, Midland, Tex. 79701

[21] Appl. No.: 20,832

[22] Filed: Mar. 16, 1979

[51] Int. Cl.³ .................. E21B 36/00; E21B 43/22; E21B 43/27

[52] U.S. Cl. ............................ 166/305 R; 166/302; 166/307

[58] Field of Search ............... 166/302, 305 R, 307, 166/312

[56] References Cited

U.S. PATENT DOCUMENTS

| | | | |
|---|---|---|---|
| 1,843,002 | 1/1932 | Small | 166/302 X |
| 3,076,762 | 2/1963 | Dill | 166/307 |
| 3,195,634 | 7/1965 | Hill | 166/302 |
| 3,353,597 | 11/1967 | Mulder . | |
| 3,354,957 | 11/1967 | Every et al. | 166/307 X |
| 3,386,511 | 6/1968 | Messina | 166/302 X |
| 3,612,183 | 10/1971 | Shillander et al. | 166/312 |

Primary Examiner—James A. Leppink
Assistant Examiner—George A. Suchfield
Attorney, Agent, or Firm—Gerald G. Crutsinger; John F. Booth; Harry C. Post, III

[57] ABSTRACT

A method of stimulating production from an oil well capable of primary production of an oil bearing strata, comprising the steps of injecting liquid carbon dioxide down the bore of the oil well at a pressure sufficient for gaseous carbon dioxide, formed by the evaporation of the liquid carbon dioxide, to permeate through the strata and react with connate water to make carbonic acid. The well is then shut in for a period of time enabling the carbonic acid to react with the rocks in the strata to increase the permeability of the strata and thereby stimulate production from the oil well.

7 Claims, 2 Drawing Figures

WELL TREATING METHOD

BACKGROUND AND BRIEF SUMMARY OF THE INVENTION

Acids, such as hydrochloric, sulfuric and carbonic, for stimulating the production from an oil well are well known. Conventionally these acids are liquids, which are injected into the oil well to react with rocks in the oil bearing strata and thereby increase the permeability of the strata. When this is done, the acids being pumped down the production tubing or casing will react with the material used to make such tubing or casing unless an inhibitor is mixed with the acid.

Accordingly, it is the primary object of the present invention to inject liquid carbon dioxide down the bore of an oil well to form carbonic acid with the connate water in the strata. The carbonic acid reacts with the rocks in the strata to increase permeability, but the likelihood of damage to the production tubing and casing of the well is inhibited because no acid is pumped therethrough.

The technique of forming acids in situ with the oil bearing strata in secondary and tertiary production wells, such as flooding are well known. Commonly, a gas is formed in the strata and the gas reacts with either drive water or connate water to form the acid. Some examples of these techniques are set forth in U.S. Pat. No. 2,001,350; 3,072,185; 3,091,292; 3,259,187; 3,344,858; 3,353,597; 3,392,782; 3,398,791; and 3,532,165. However, no one to date has suggested injecting a liquid carbon dioxide down the bore of an oil well capable of primary production to form carbonic acid in the strata which reacts with rocks in the strata to thereby increase the permeability of the strata.

It is therefore an object of the present invention to provide a method of stimulating production from an oil well by injecting liquid carbon dioxide down the bore of the well to form carbonic acid with connate water in the strata which increases the permeability of the strata.

In accordance with the invention, a method of stimulating production from an oil well capable of primary production out of an oil bearing strata comprises the steps of injecting an anhydrous liquid including liquid carbon dioxide down the well bore having a casing at a pressure which enables gaseous carbon dioxide, formed by the evaporation of the liquid carbon dioxide, to permeate through the strata and react with connate water to make carbonic acid in the strata outside the casing. The well is then shut in for a period of time sufficient for the carbonic acid to react with rocks in the strata which thereby increases the permeability of the strata and stimulates production from the oil well.

BRIEF DESCRIPTION OF THE DRAWINGS

Other objects and advantages of the invention will become apparent upon reading the following detailed description and upon reference to the drawings, in which like reference characters are used throughout to designate like parts.

While the invention will be described in connection with a preferred procedure, it will be understood that is not intended to limit the invention to that procedure. On the contrary, it is intended to cover all alternatives, modifications and equivalents as may be included within the spirit and scope of the invention as defined by the appended claims.

DETAILED DESCRIPTION OF THE INVENTION

Figure 1:
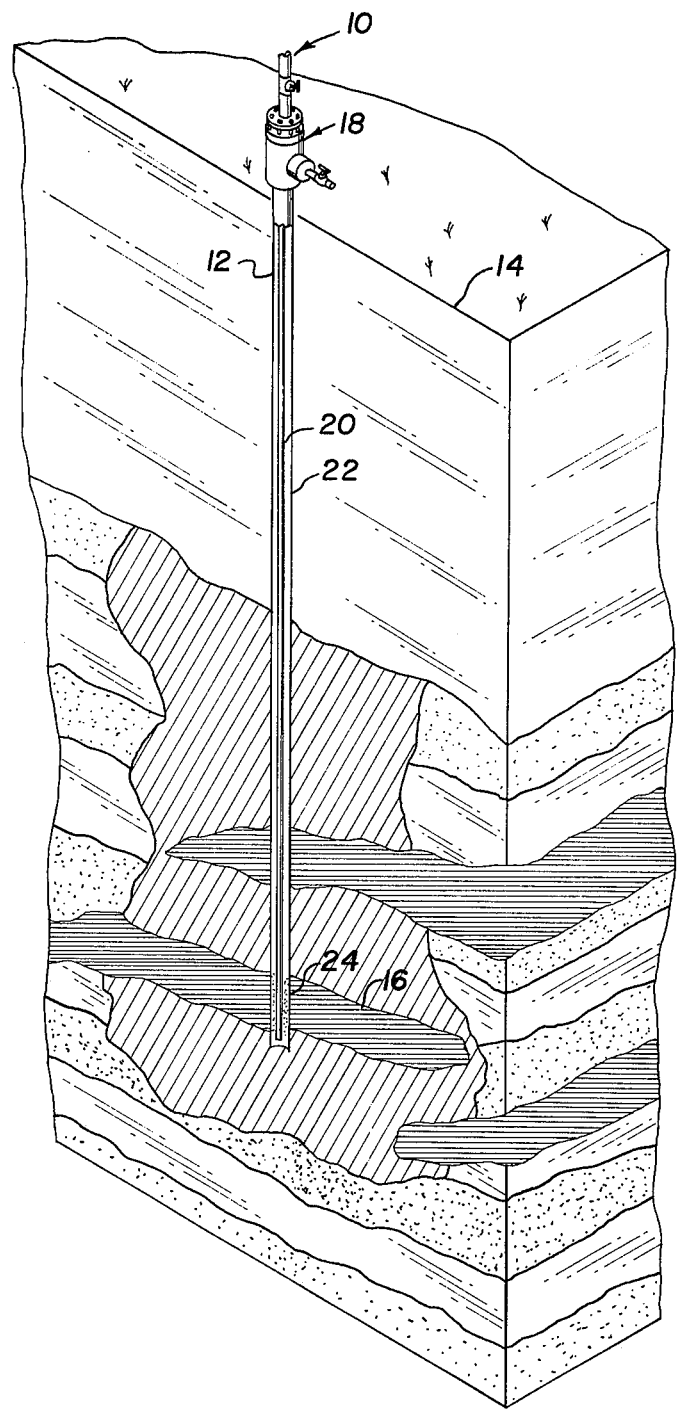
FIG. 1 is an elevational, perspective view of a typical oil well extending down through a geological formation.

Turning first to FIG. 1, there is shown an oil well 10 having a bore 12, which extends from the earth's surface 14 through several geological formations including oil bearings strata 16. This oil well is capable of primary production, which means that the energy in the reservoir is sufficient to flow the gas, hydrocarbons or oil back into the producing well's bore while secondary production means the use of an artificial pressure, obtained such as by flooding, to sweep the hydrocarbons from a water injection well toward the producing well.

Well 10 includes a well head 18 connected to production tubing 20 and casing 22 which has perforations 24 permitting the oil to drain from strata 18 into the bottom of well bore 12 for transportation upward therefrom via production tubing 20 to well head 18.

Figure 2:
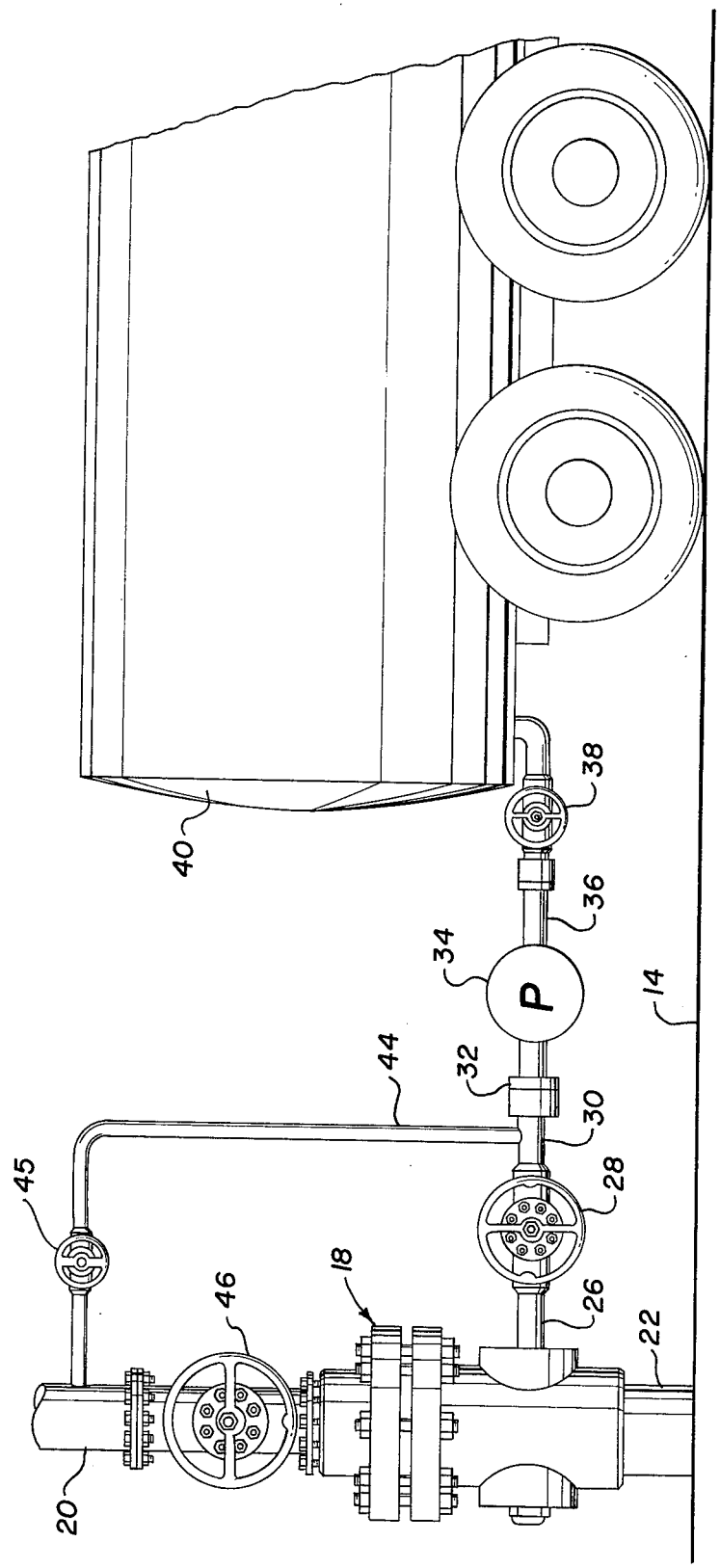
FIG. 2 is a view of apparatus which injects the liquid carbon dioxide into the well shown in FIG. 1.

As shown in FIG. 2, apparatus is provided for injecting liquid carbon dioxide in the well and has a first pipe 26 extending substantially parallel to the earth's surface 14 and has a valve 28 mounted therewith to control fluid communication into the annulus of well bore 12 formed between producion tubing 20 and casing 22. A second pipe 30 is mounted with valve 28 and outlet end 32 of pump 34. The inlet end 36 of pump 34 is coupled to a valve 38 mounted in fluid communication with a moveable tank 40 which supports liquid carbon dioxide. An inverted L-shaped pipe 44 having a valve 45 mounted therewith is connected to second pipe 30 and production tubing 20 with a valve 46 mounted in production tubing 20 to control the passage of fluid therethrough.

In operation, valves 45 and 46 are closed and valve 28 opened. Pump 34 is then activated for withdrawing the liquid consisting essentially of liquid carbon dioxide from tank 40 and passing down the annulus of well bore 12, which carries the liquid carbon dioxide down casing 22 to the bottom of bore 12. Valve 46 is then opened to permit passage of the carbon dioxide up production tubing 20 and thereby remove liquids, scale and other impurities from the bottom of the well bore. The liquid carbon dioxide may then be pumped down either or both the annulus of well bore 12 or production tubing 20 to the bottom of the well bore. Sufficient liquid carbon dioxide is injected down the well to provide a pressure enabling gaseous carbon dioxide, formed by the evaporation of the liquid carbon dioxide, to permeate through strata 16 and react with connate water and make carbonic acid. When sufficient carbon dioxide has been added, valves 28 and 46 are closed to shut in the well for a period of time enabling the carbonic acid to react with the rocks in the strata and thereby increase the permeability of the strata which in turn stimulates production of oil out of the oil bearing strata. Because carbonic acid is considered a weak acid, this shut in time may be registered in days or weeks rather than in hours as in the strong acids, such as sulfuric and hydrochloric. Since the rection time of the carbonic acid is relatively slow, it penetrates the strata more deeply than the strong acids before spending itself.

Since well logging techniques permit the quantity of connate water supported within the strata to be determined, it is possible to determine the quantity of liquid carbon dioxide necessary to be injected into the well to enable formation of carbonic acid a selected distance outwardly from the bottom of the well. Accordingly, a quantity of liquid carbon dioxide is chosen for injection into the well sufficient to form carbonic acid a preselected distance outwardly from the well bottom.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of stimulating production from an oil well capable of primary production out of an oil bearing strata, comprising the steps of: injecting an anhydrous liquid including liquid carbon dioxide down a well bore having a casing at a pressure sufficient for gaseous carbon dioxide, formed by the evaporation of the liquid carbon dioxide, to permeate through the strata and react with connate water to make carbonic acid in the strata outside the casing; and shutting in the well for a period of time sufficient to enable the carbonic acid to react with rocks in the strata to increase the permeability of the strata and thereby stimulate production from the oil well.

2. The method as set forth in claim 1, including choosing a quantity of liquid carbon dioxide injected into the well which is sufficient for the carbonic acid to be formed a selected distance outwardly from the bottom of the well.

3. The method as set forth in claim 1, wherein injecting the liquid includes pumping the liquid down the production tubing of the well.

4. The method as set forth in claim 1, wherein injecting the liquid includes pumping the liquid down the annulus formed between the production tubing and casing of the well.

5. The method as set forth in claim 1, wherein injecting the liquid includes pumping the liquid down the production tubing and down the annulus formed between the production tubing and casing of the well.

6. The method as set forth in claim 1, including cleaning the well bore by pumping the liquid down the casing of the well for exhaustion out of the production tubing to remove liquids and scale from the bottom of the well.

7. The method as set forth in claim 1, including the step of choosing the liquid to consist essentially of liquid carbon dioxide.

* * * * *